US007536333B1

(12) United States Patent
Omansky (10) Patent No.: US 7,536,333 B1
(45) Date of Patent: May 19, 2009

(54) SYSTEM OF HEDGE FUND RATINGS

(76) Inventor: Joseph Hy Omansky, 4 Independence Dr., East Brunswick, NJ (US) 08816

( * ) Notice: Subject to any disclaimer, the term of this patent is extended or adjusted under 35 U.S.C. 154(b) by 562 days.

(21) Appl. No.: 11/152,606

(22) Filed: Jun. 14, 2005

Related U.S. Application Data (60) Provisional application No. 60/579,393, filed on Jun. 14, 2004.

(51) Int. Cl.
G06Q 40/00 (2006.01)
(52) U.S. Cl. .................................. 705/36 R
(58) Field of Classification Search ................ None
See application file for complete search history.

(56) References Cited

U.S. PATENT DOCUMENTS

| | | | | |
|---|---|---|---|---|
| 6,349,291 B1 * | 2/2002 | Varma | ......................... | 705/35 |
| 2002/0147670 A1 * | 10/2002 | Lange | ......................... | 705/35 |
| 2002/0198833 A1 * | 12/2002 | Wohlstadter | ................. | 705/40 |
| 2003/0046209 A1 * | 3/2003 | Brandenberger et al. | ...... | 705/36 |
| 2003/0130920 A1 * | 7/2003 | Freund | ......................... | 705/35 |
| 2003/0236742 A1 * | 12/2003 | Lawrence | .................... | 705/38 |
| 2004/0024671 A1 * | 2/2004 | Freund | ......................... | 705/35 |
| 2004/0044505 A1 * | 3/2004 | Horwitz | ......................... | 703/3 |
| 2004/0111358 A1 * | 6/2004 | Lange et al. | ................. | 705/37 |
| 2005/0027638 A1 * | 2/2005 | Ng et al. | ........................ | 705/37 |

OTHER PUBLICATIONS

Ding et al. Journal of Banking & Finance. vol. 33, Issue 5, May 2009, pp. 883-891.*
Fitch Says It Has Enhanced Servicer Ratings. (Mar. 2003). National Mortgage News, 27(23), 7. Retrieved Mar. 5, 2009, from Banking Information Source database. (Document ID: 298178451).*

MacRae, Desmond. (Nov. 1994). The frontiers of risk management. Global Investor,(77), 35. Retrieved Mar. 5, 2009, from ABI/INFORM Global database. (Document ID: 8740813).*

* cited by examiner

Primary Examiner—Hani M. Kazimi
Assistant Examiner—Muriel Tinkler
(74) Attorney, Agent, or Firm—Proskauer Rose Brown Raysman (57) ABSTRACT

The SkyRank System is a hedge fund rating system that accepts a combination of independent hedge fund characteristics and computes output components that are averaged into one number that defines the overall risk, performance and credibility of hedge funds. The system derives formulas in a unique way to systematically rate multiple hedge funds. The system generates three related ratings from the algorithm: Absolute SkyRank, Lettered SkyRank, and Relative SkyRank. The system includes a computer, database accessible by the computer, and a coded program of interconnected conditional formulas. The SkyRank formulas are connected at pivot points and the pivot points are flexible on a typical x-y axis. Absolute SkyRank is computed based upon any combination of multiple hedge fund characteristics. Lettered SkyRank and Relative SkyRank are related systems computed from Absolute SkyRank which is represented by a number ranging from 0 to 5, 0 as the most desirable and 5 as the least desirable Absolute SkyRank. The Sky Rank System was derived to identify low risk, established hedge funds with attractive risk-return characteristics; hedge funds that are very appropriate for the entire investment community, retail investors and accredited investors alike. The basis of the Sky Rank System is a data process that can be easily adapted to change formulas to accommodate an investor's appetite for various levels of risk, return and credibility, not only for the hedge fund characteristics described here, but for any aspect of a hedge fund that a user finds important.

18 Claims, 8 Drawing Sheets

Figure 1:
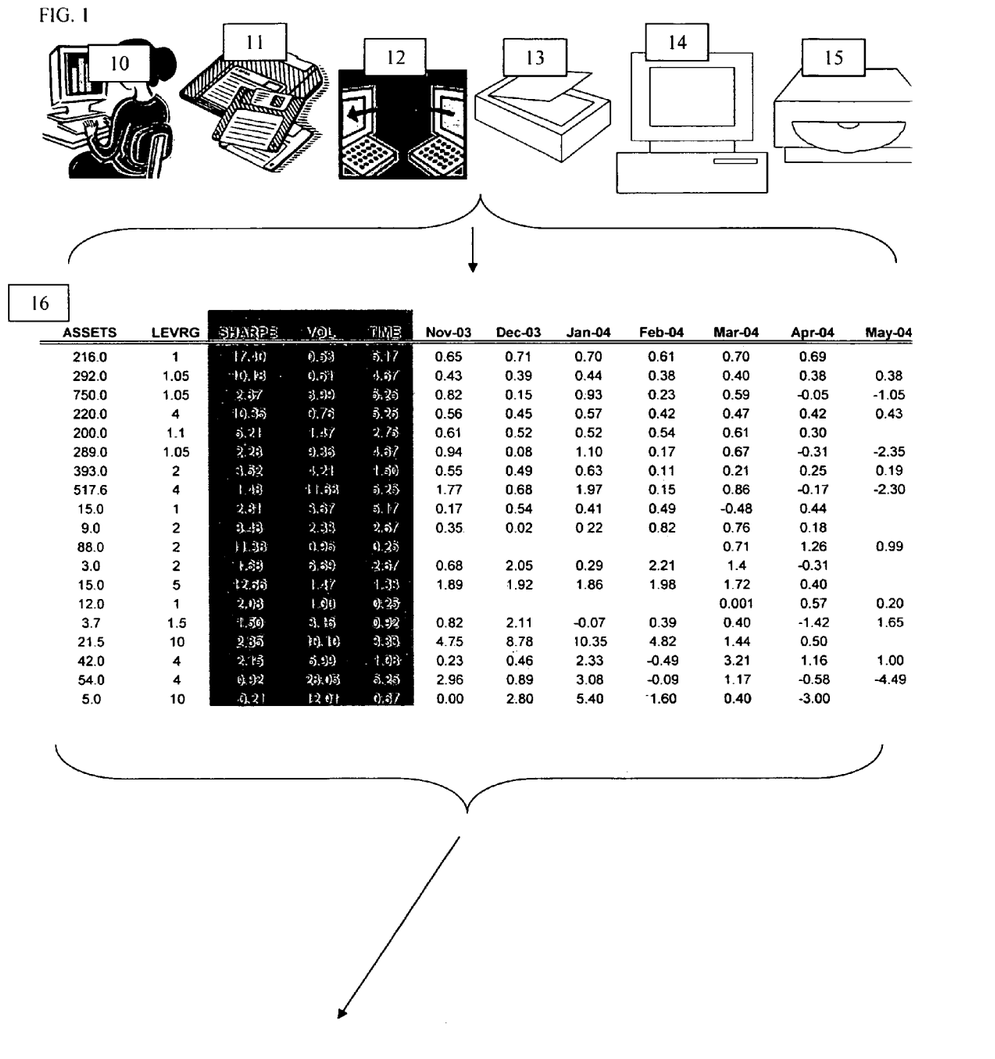
FIG. 1 shows various methods of obtaining data and moving the data into database format, rating the funds, and further methods of moving the ratings outside of the database.
Figure 1A:
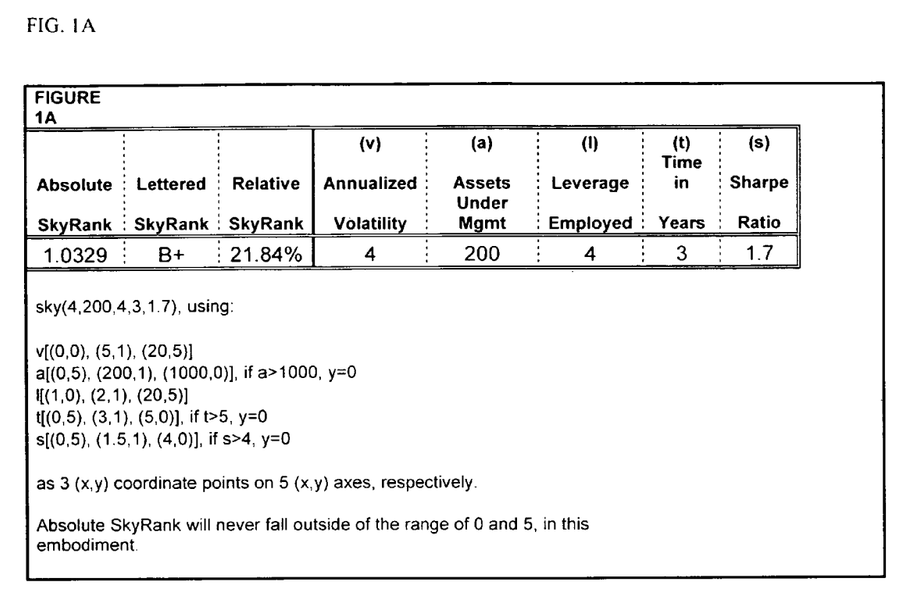
FIG. 1A shows the calculated Absolute SkyRank, Lettered SkyRank, and Relative SkyRank, a typical representation of a typical set of hedge fund data characteristics (volatility (v), assets (a), leverage (l), time (t), and Sharpe Ratio (s)), and how the hedge fund rating system function appears with inputs (sky(4,200,4,2,1.7), respectively. Three (x,y) coordinate points for five axes are displayed in the figure.

| FIGURE 1A | | | | | | | |
|---|---|---|---|---|---|---|---|
| | | | (v) | (a) | (l) | (t) Time | (s) |
| Absolute SkyRank | Lettered SkyRank | Relative SkyRank | Annualized Volatility | Assets Under Mgmt | Leverage Employed | in Years | Sharpe Ratio |
| 1.0329 | B+ | 21.84% | 4 | 200 | 4 | 3 | 1.7 | sky(4,200,4,3,1.7), using:

v[(0,0), (5,1), (20,5)]
a[(0,5), (200,1), (1000,0)], if a>1000, y=0
l[(1,0), (2,1), (20,5)]
t[(0,5), (3,1), (5,0)], if t>5, y=0
s[(0,5), (1.5,1), (4,0)], if s>4, y=0 as 3 (x,y) coordinate points on 5 (x,y) axes, respectively.

Absolute SkyRank will never fall outside of the range of 0 and 5, in this embodiment.

SYSTEM OF HEDGE FUND RATINGS

CROSS-REFERENCE TO RELATED APPLICATIONS

This application claims the benefit of provisional patent application Ser. No. 60/579,393, filed 2004 Jun. 14 by the present inventor.

FEDERALLY SPONSORED RESEARCH

Not Applicable

SEQUENCE LISTING

Not Applicable

BACKGROUND OF THE INVENTION

1. Field of Invention

This invention relates to hedge funds, specifically to an improved method of ranking and rating hedge funds.

2. Prior Art

Rating methodologies in financial services are helpful for the end user, or investor, to quickly learn of high and low quality investment options, without the need for detailed analysis or extensive knowledge about the field.

A published patent and patent application search reveals no hedge fund rating system patents existing or in process today.

Most hedge fund ranking systems and most financial services ranking and rating tools use a basic straight-line sorting mechanism. That sorting mechanism allows a user to choose from a menu of hedge fund characteristics, such as assets under management, volatility, Sharpe Ratio, returns, time, and others, and to state various criteria limits to those hedge fund characteristics. For example, a user can state that he is interested in hedge funds over $300 million in assets, annualized volatility under 7%, annualized returns over 15%, etc. A certain subset of hedge funds, fitting stated criteria, from a database is returned from the sorting mechanism, based on the limitations stated.

There are a number of flaws to such a sorting mechanism. Firstly, it returns only a subset of funds from the database, those fitting all of the criteria stipulated in the sort, disallowing the user from viewing all of the funds in the database on a relative basis. Next, the sorting mechanism evaluates the first characteristic independently, stores the funds that fit that criteria, evaluates the next characteristic, stores the funds that fit that characteristic, etc. This reduces the quality of fund selection further, ruling out a fund that may be superior to all in the database according to one criteria, yet inferior according to other criteria. Finally, the sorting mechanism does not assign a value to each fund. Moreover, there is no system that this inventor knows of in place today that assigns values within a stated and finite range allowing all funds in a database to compared on a detailed, relative and continuous basis.

Arguably, the best known mutual fund rating system is that of Morningstar. Morningstar's simple rating methodology analyzes risk-adjusted returns over 10-year, 5-year, and 3-year time frames, weighting them 50%, 30%, and 20% respectively[1]. These resultant scores are compared across specific style, with the top 10% of scores assigned 5 stars, the next 22½% assigned 4 stars, the middle 35% assigned 3 stars, the next 22½% assigned 2 stars, and the bottom 10% assigned 1 star. There are a number of shortcomings to this method overall, and specifically with application to hedge funds.

How Does Morningstar Rate Funds? Morningstar, Inc.

Firstly, this method does not allow for a comparison of one fund versus all funds in an entire database; it is only applied to funds within the same style group. Next, Morningstar's methodology is relative, not absolute. There is no absolute numerical rating falling within a specified range of numbers, at which to compare the funds on an ongoing basis. Furthermore, this method does not have a robustness or flexibility to satisfy the diverse nature and various aspects of hedge funds.

Standard and Poor's currently rates hedge funds that are located outside the United States through company affiliates that were recently acquired. They take a qualitative approach to evaluating a hedge funds' overall business, much like the company's approach to rating a bond. While qualitative analysis has its advantages, it is impossible to systematically evaluate hedge funds ongoing with such a methodology.

Fitch Ratings takes a qualitative approach to rating hedge funds. The company's methodology is one of assessing the management team, time in business, cash on the books, and other overall business health concerns, in addition to general performance information. Currently Fitch has rated only a few fund companies due to the time-consuming efforts associated with their rating methodology. It is impossible to evaluate thousands of funds simultaneously with such a methodology.

According to the website of The Hedge Fund Consistency Index, "The Hedge Fund Consistency Index: profiles 4000 hedge funds. It also ranks 4000 hedge funds according to the Consistency Index. It is available only for qualified, eligible sophisticated investors. Qualified investors can register for access to the profiles, rankings and the formula for the consistency index." There is little additional information available on this ranking methodology. According to the company's data provider, Barclay Trading Group Ltd, contact information is not permitted to be sold with the ratings to subscribers. A rating system not accompanied by contact information lacks value to the user, as the user does not know where to go to locate a highly rated fund.

Allenbridge Hedge Info is a UK-based firm that rates hedge funds and other investment products. The company recently announced that they are adopting a hedge funds awards model in cooperation with MARHedge, a hedge fund news service wholly-owned by a UK parent company, Metal Bulletin plc. While little information is known on the rating methodology of Allenbridge Hedge Info, a recent news release with a quote from a director of the company sheds light on their model. Speaking about their jointly-held awards dinner, "There were definitely some surprises among the winners but we felt very strongly that the judging process needed to reflect not just performance but also volatility, risk and compliance issues," added Jacob H. Schmidt, director of hedge fund research at Allenbridge Hedgeinfo. "We passed over some funds with triple-digit performance records. It was important to us to evaluate funds holistically, as investors do, and we remained true to that objective." This reveals that part of the rating process is subjective and left up to a panel of judges. In other words, there is a humanistic element to that type of rating process, and therefore it is not entirely systematic or quantitative. Such a method does not entirely leave the process of ranking a fund to a quantitative process, and by its nature, does not lend itself to a comparative, ongoing ranking and rating tool.

Global Fund Analysis (GFA) uses "in-depth question and answer interviews" to allow their team of analysts to assign ratings to funds, currently 50 are rated by the company. GFA puts funds through a "screening process". They look at investment style, adviser group, risk management, performance history. GFA's analysis, while partially quantitative, is largely qualitative in nature, the qualitative analysis performed by a team of analysts, and their method does not encompass an absolute rating at which hedge funds can be compared on an ongoing basis.

In U.S. Patent Application #20050075962, Dunne, Richard C., "Method for analyzing investments using overlapping periods," this method specifically relates to "performance and diversification" and is limiting in its scope with a different derivation technique than the invention contained in this application. Further benefits to this referenced invention, specific to robustness, are explained later in describing my invention's objects and advantages.

OBJECTS AND ADVANTAGES

Accordingly, several objects and advantages of my invention are:

(a) to provide a uniform formulaic derivation technique that allows for the limitation of the output presented in the form of a rating, measured within a finite range, which allows for a simpler and more precise comparative ranking to be utilized ongoing for the purpose of comparing hedge funds;

(b) to provide a uniform methodology that evaluates multiple hedge fund characteristics that is entirely systematic for the purpose of ranking and rating hedge funds;

(c) to provide a rating methodology that is entirely systematic, not qualitative in nature, and not the result of a panel of judges, evaluators, or analysts;

(d) to provide a simple rating to be viewed by the user in number, letter, and percentage form, all ratings with generally the same meaning, viewed differently;

(e) to provide contact information with the ratings, so users are able to contact the funds directly;

(f) to provide a system that, among other attributes, can reward hedge funds that deliver high risk-adjusted returns as measured by Sharpe Ratio, which is defined as: the annualized returns above a risk-free rate of return, all divided by the annualized standard deviation of those returns, of formula, $(R_i-R_f)/(sd)$, where $R_i$ is the Annualized Return of the hedge fund, $R_f$=the current 3 month T-bill rate, and $sd=\sqrt{(n\Sigma x^2-(\Sigma x)^2)/n(n-1)}$.

(g) to provide a system that, among other attributes, can reward hedge funds exhibiting a certain level of volatility of returns;

(h) to provide a system that, among other attributes, can reward hedge funds exhibiting a certain level of leverage;

(i) to provide a system that, among other attributes, can reward hedge funds exhibiting a certain level of time managing assets;

(j) to provide a system that, among other attributes, can reward hedge funds exhibiting a certain level of liquidity of the underlying investments within the hedge fund;

(k) to provide a system that, among other attributes, can reward hedge funds exhibiting a certain level of gamma risk of the portfolio of securities inside the hedge fund, said gamma risk defined as delta sensitivity within a portfolio (l) to provide a system that, among other attributes, can reward hedge funds exhibiting a certain level of vega risk of the portfolio of securities inside the hedge fund, said vega risk defined as a sensitivity of portfolio value to volatility movements (m) to provide a system that, among other attributes, can reward hedge funds exhibiting a certain level of theta risk of the portfolio of securities inside the hedge fund, said theta risk defined as a risk of premium decay of a portfolio of securities (n) to provide a system that, among other attributes, can reward hedge funds exhibiting a certain level of delta risk of the portfolio of securities inside the hedge fund, said delta risk defined as a risk of portfolio value due to a directional change in the underlying securities;

(o) to provide a system that, among other attributes, can reward hedge funds exhibiting a certain level of rho risk of the portfolio of securities inside the hedge fund, said rho risk defined as a risk of portfolio value due to a change in interest rates;

(p) to provide a system that, among other attributes, can reward a hedge fund based upon alpha generation;

(q) to provide a system that, among other attributes, can accept any quantifiable hedge fund characteristic as an input into the model, and with great consistency incorporate it into the system discussed herein, to derive multiple formulas for the purposes of rating a hedge fund, under one defined system;

(r) to provide a system that, when capital is allocated to the highest SkyRanked funds in a portfolio of hedge funds, the result is typically a portfolio with lower volatility and higher returns the majority of the time.

Further objects and advantages of my invention will become apparent from consideration of the drawings and ensuing description.

SUMMARY

The invention is a data processing system that uses multiple (x,y) coordinate points on multiple (x,y) axes to derive multiple linear formulas which may further be translated into quadratic formulas, to rate one or more hedge funds numerically, alphabetically, and on a percentage basis, with the ratings all falling within a pre-determined finite range, 0-5 for Absolute SkyRank, A-E for Lettered SkyRank, 0%-100% for Relative SkyRank.

DRAWINGS

Figures

DRAWINGS

Reference Numerals

Individual user keypunching hedge fund data into electronic storage device which may include a database, computer, pda, cellphone, or other wired or wireless electronic component.

11 Electronic storage device
12 Internet
13 Scanner
14 Computer
15 Disc drive
16 Database or other electronic storage device holding actual hedge fund data which may be previously calculated or calculated within a database or other place
17 Absolute SkyRank Rating of hedge funds from database or other electronic storage device
18 Lettered SkyRank Rating of hedge funds from database or other electronic storage device
19 Relative SkyRank Rating of hedge funds from database or other electronic storage device.
20 Volatility (x, y) coordinate point, v1 (0, 0)
21 Volatility (x, y) coordinate point v2 (5, 1)
22 Volatility (x, y) coordinate point v3 (5, 5)
23 Line segment connecting points v1 and v2
24 Line segment connecting points v2 and v3
25 Asset (x, y) coordinate point, a1 (0, 5)
26 Asset (x, y) coordinate point a2 (200, 1)
27 Asset (x, y) coordinate point a3 (1000, 0)
28 Line segment connecting points a1 and a2
29 Line segment connecting points a2 and a3
30 Line segment limiting asset output, y = 0
31 Leverage (x, y) coordinate point, l1 (0, 0)
32 Leverage (x, y) coordinate point l2 (2, 1)
33 Leverage (x, y) coordinate point l3 (20, 5)
34 Line segment connecting points l1 and l2
35 Line segment connecting points l2 and l3
36 Time (x, y) coordinate point, t1 (0, 5)
37 Time (x, y) coordinate point t2 (3, 1)
38 Time (x, y) coordinate point t3 (5, 0)
39 Line segment connecting points t1 and t2
40 Line segment connecting points t2 and t3
41 Line segment limiting Time output, y = 0
42 Sharpe Ratio (x, y) coordinate point, s1 (0, 5)
43 Sharpe Ratio (x, y) coordinate point s2 (1.5, 1)
44 Sharpe Ratio (x, y) coordinate point s3 (4, 0)
45 Line segment connecting points s1 and s2
46 Line segment connecting points s2 and s3
47 Line segment limiting Sharpe Ratio output, y = 0

DETAILED DESCRIPTION

FIGS. 1, 2, 3, 4, 5, and 6

A preferred embodiment of the invention is illustrated in FIGS. 1, 2, 3, 4, 5, and 6. FIG. 1 displays various methods that data is retrieved and then inputted into a database or spreadsheet, ratings calculated and then moved from the spreadsheet to another location. Data can be keypunched 10 manually into a database from a hardcopy, downloaded from a floppy disk 11, file or database 11, moved from one computer to another computer (for example, downloaded from the internet) 12, scanned 13, downloaded from a hard-drive 14, and/or downloaded from a cd 15. The data, some or all of which may or may not be provided by database companies, and some or all of which may or may not be calculated by user, is stored on a database or spreadsheet 16. The SkyRank Rating result of the system reveals the Absolute SkyRank 17, Lettered SkyRank 18, and/or Relative SkyRank 19. The results, as well as the original data may be moved to a database, spreadsheet, hardcopy, or webpage by manually keypunching 10, uploading to a floppy disk 11, file 11 or database 11, moved from one computer to another computer (for example, downloaded from the internet) 12, scanned 13, downloaded from a harddrive, and/or saved to a cd 15. The system is stored in Visual Basic for Applications (VBA), Matlab, C++, or another program and the SkyRank calculations are performed on the data by the system.

Figure 2:
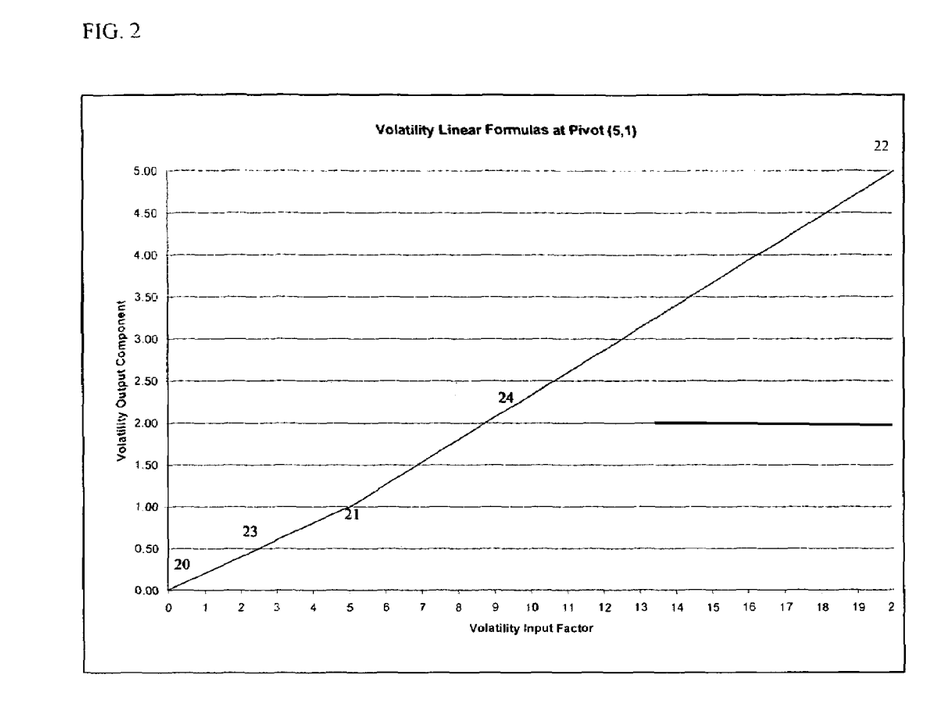
FIG. 2 shows a volatility hedge fund characteristic with 3 (x,y) volatility coordinate points on 1 (x,y) volatility axis.

FIG. 2 shows the volatility (x,y) coordinate points, corresponding line segments, on the volatility axis.

The volatility (x,y) coordinate point (5,1) was chosen because the user believes the hedge fund characteristic, 5 for volatility, is considered quite a low level of volatility, i.e., low risk. We will be using a level of 1 for the output component throughout our formula construction for our pivot points for each element studied. A value of 1 on a scale of 0 to 5, with 0 as the most favorable and 5 as the least favorable, is considered very attractive, with a value of 0 considered perfect. A value of 1 is assigned for the y-value, thus the volatility (x,y) coordinate point variable of (5,1) is created. This is a common volatility (x,y) coordinate point used for both volatility line segments for the construction of the volatility part of the system; this point connects the two line segments which make up our volatility functions. The volatility (x,y) coordinate point (0,0) 20 is chosen as the most attractive. 0 level of volatility is the lowest level of volatility possible, and 0 is assigned for the y-value, as the most attractive volatility y-value. The volatility line segments that will be created by connecting the volatility (x,y) coordinate points, will be used for the volatility part of the code. Those formulas will accept the volatility hedge fund characteristics of any hedge fund. This volatility value is one part of the entire system, and will be used for the final averaging along with the other hedge fund characteristic values (asset, leverage, time, and Sharpe Ratio, all of which will use the same derivation technique. Now we have two volatility (x,y) coordinate points (5,1) 21 and (0,0) 20 in order to construct a line. Using simple algebra, we use the two points to find the slope of the line by the formula $m=(y_1-y_2)/(x_1-x_2)$, or $(1-0)/(5-0)=1/5$. So, the slope of our first minimum limitation line segment for the volatility portion of the algorithm is 1/5. We use the formula $y=mx+b$, where m=slope and b=y-intercept. Using substitution, plugging one of the points, (0,0), into the formula with m=1/5, and solving, we see that b=0, or the y-intercept is 0, thus our formula is $y=1/5x+0$ or $y=0.2x$ 23. As we see from FIG. 2, this is the formula used for the first line segment 23 of our volatility functions. We again use the common volatility (x,y) coordinate point (5,1) 21 to form line segment 24. Now, the user chooses what can be considered as a high level of volatility. We choose 20. 20 is now the x-value of the third volatility (x,y) coordinate point. We associate the hedge fund characteristic of 20 with the maximum possible output component, 5. Y-values used for the rating always range between 0 and 5. This point, (20,5) 22 is now the second point to use for line segment 24, along with the common point of (5,1). So we have two points for the second line segment 24. To find the formula for the second line segment 24, we use the two points to find the slope of the line by the formula $m=(y_1-y_2)/(x_1-x_2)$, or $(5-1)/(20-5)=4/15$. So, the slope of our second line segment 24 is 4/15. We use the formula $y=mx+b$, where m=slope and b=y-intercept. Using substitution, plugging one of the points, (20,5), into the formula with m=4/15, and solving, we see that b=−1/3, or the y-intercept is −1/3, thus our formula is $y=4/15x-1/3$ 24.

Figure 3:
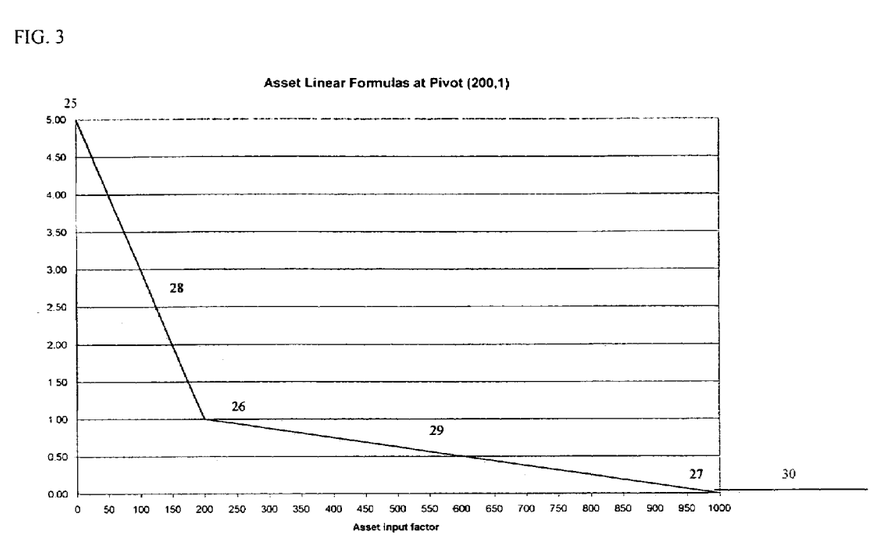
FIG. 3 shows an asset hedge fund characteristic with 3 (x,y) asset coordinate points on 1 (x,y) asset axis.

Volatility Formulas $y = 0.2x$, if $x < 5$ $y = 4/15x - 1/3$, if $x \geq 5$ on a volatility (x,y) axis FIG. 3 shows three constructed asset line segment, 28, 29, 30. The same linear algebra technique described in detail above is used to form the asset formulas.

The first common point (200,1) 26 is chosen because the user believes the hedge fund characteristic, 200 (200 million) for assets, is considered quite a considerable level of assets, i.e., high investor confidence in the hedge fund or high credibility. We will be using a level of 1 for the output component throughout our formula construction for the y-value of our common point. A value of I is assigned for the y-value, thus the (x,y) coordinate point (200,1) 26. The common point for the asset functions is (200,1) 26. This is the common point used for both linear segments for the construction of the asset part of the algorithm; this point connects the two line segments 28, 29 which make up two of our asset functions. (0,5) 25 is chosen. 0 level of assets is the lowest level of assets possible, and 5 is assigned for the y-value, the worst possible rating. Now we have two points (200,1) 26 and (0,5) 25 in order to construct a line segment 28. The same logic as described in FIG. 2 is used to construct the line segment formula 28. Thus, our formula for line segment 28 is y=−1/50x+5. As we see from FIG. 3, this is the formula used for the first line segment of our asset functions. For our maximum limitation line segment, we again use the common pivot point (200,1). Now, the user chooses what can be considered as a very high level of assets for the maximum limitation hedge fund characteristic. We choose 1000. 1000 is now the x-value for the line segment 29. We associate the hedge fund characteristic of 1000 with the y-value, 0. We believe that 1000, or $1 billion for assets is very high; this represents a high level of investor confidence in the hedge fund. Therefore, we assign the highest quantitative output component, y-value 0, to this hedge fund characteristic. The y-value, output components always range between 0 and 5, 0 as the most attractive and 5 as the least attractive. This point, (1000,0) 27 is now the second point to use for line formula construction, along with the common asset (x,y) coordinate point of (200,1) 26. So we have two points for the second line segment from which to construct our next line segment 29. Again, we use basic algebra, solving for slope and y-intercept to derive y=−1/800(x)+5/4 29. If we plugged 10000 into our formula y=−1/800a+5/4, we would get a highly negative number that would skew our final results. It is this user's opinion that there is minimal added value in terms of credibility for a hedge fund that has $1 billion in assets, $2 billion in assets, or $10 billion in assets. So, we have a third asset function that returns 0 for any asset level above 1000 ($1 billion). This formula is y=0 (x), or y=0, for assets of 1000 ($1 billion) or higher.

Figure 4:
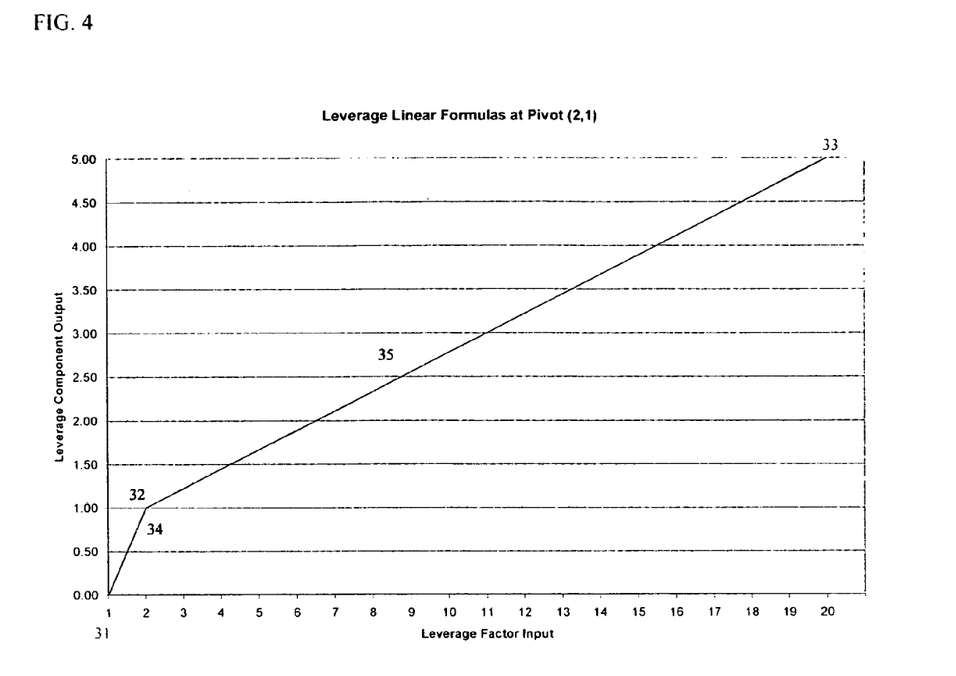
FIG. 4 shows a leverage hedge fund characteristic with 3 (x,y) leverage coordinate points on 1 (x,y) leverage axis.

Asset Linear Formulas $y = -1/50(x) + 5$, if $x \leq 200$ $y = -1/800(x) + 5/4$, if $x \geq 200$ $y = 0(x)$, if $x \geq 1000$ FIG. 4. shows two constructed leverage formulas 34, 35. All other formulas are constructed similarly to the above volatility and asset formulas. I will briefly describe them without going into the extensive detail of volatility and asset functions above. Leverage linear formulas are derived based upon the common pivot point (2,1) 32. Minimum hedge fund characteristic 1, and corresponding y-value 0, (1,0) 31 is used to construct the first leverage line segment 34. Hedge fund characteristic 20 and corresponding y-value 5 (20,5) 33 is used to construct the next line segment 35. We now have two leverage line segments connected at leverage (x,y) coordinate point (2,1) 32.

Figure 5:
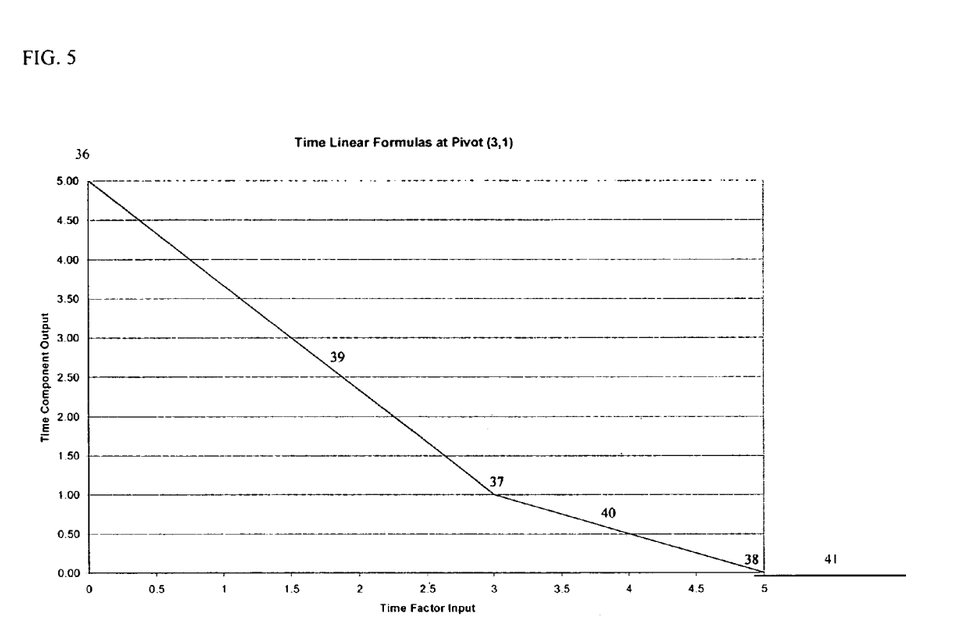
FIG. 5 shows a time hedge fund characteristic with 3 (x,y) time coordinate points on 1 (x,y) time axis.

Leverage Linear Formulas $y = (x) - 1$, if $x \leq 2$ $y = 2/9(x) + 5/9$, if $x \geq 2$ FIG. 5 shows two constructed time formulas. Time linear formulas are derived based upon the common time (x,y) coordinate point (3,1) 37. Minimum hedge fund characteristic 0 and corresponding output component 5 (0,5) is used to construct 39. Maximum hedge fund characteristic 5 and corresponding y-value 0 (5,0) is used to construct 40. There is a further limitation for any hedge fund managing money greater than 5 years. Such a hedge fund would return a 0 for the output component represented by the formula, y=0(x), below.

Figure 6:
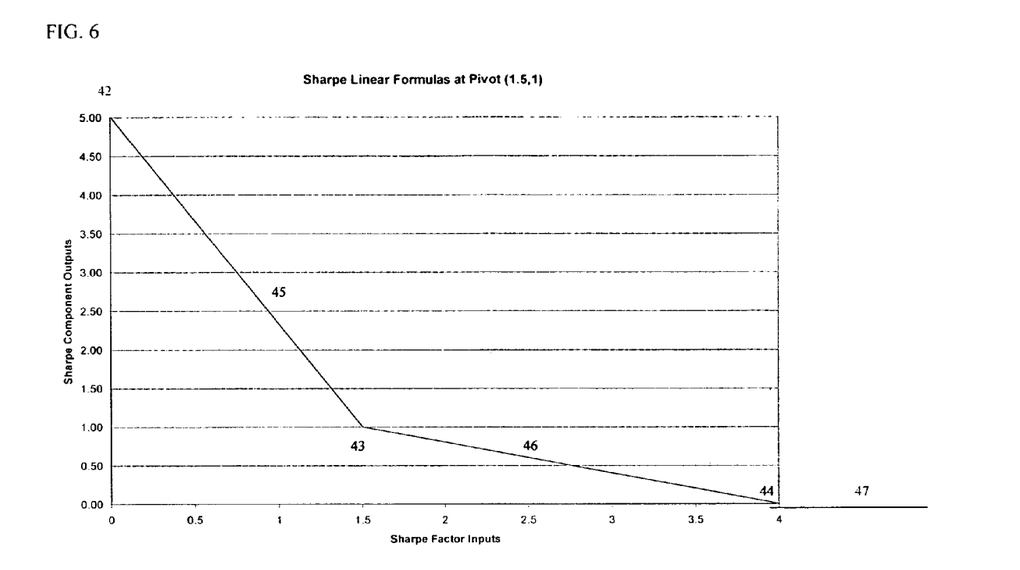
FIG. 6 shows a Sharpe Ratio hedge fund characteristic with 3 (x,y) Sharpe Ratio coordinate points on 1 (x,y) Sharpe Ratio axis.

Time Linear Formulas $y = -4/3(x) + 5$, if $x \leq 3$ $y = -1/2(x) + 5/2$, if $x \geq 3$ $Y = 0(x)$, if $x \geq 5$ FIG. 6 shows three constructed Sharpe Ratio formulas of associated Sharpe Ratio (x,y) coordinate points 42,43,44 and Sharpe Ratio line segments 45,46,47. The derivation technique is exactly the same as above. This derivation technique can be applied to any hedge fund characteristic that can be represented in numerical form.

Sharpe Ratio Formulas $y = -8/3(x) + 5$ if $x \leq 1.5$ $y = -2/5(x) + 8/5$, if $x \geq 1.5$ $y = 0(x)$, if $x \geq 4$ Operation—FIG. 1A

Once the associated hedge fund characteristic formulas are derived using the Detailed Descriptions of FIGS. 1, 2, 3, 4, 5, and 6, the operation of the system is quite simple and described below.

FIG. 1A shows just one example of the application of the SkyRank System, with actual (x,y) coordinate points and actual (x,y) axes in application. The calculated Absolute SkyRank of 1.0329, Lettered SkyRank of B+ and Relative SkyRank of 21.84% correspond to the hedge fund characteristics, all listed in the above detailed description. An example hedge fund has the following hedge fund characteristics: volatility (v) of 4%, assets (a) of $200 million, leverage (1) of 4 (to 1), time (t) managing the fund of 3 years, and a Sharpe Ratio (s) of 1.7. The sky function, in this example, has been written to accept the above five hedge fund characteristics of volatility, assets, leverage, time, and Sharpe Ratio: sky(4,200, 4,3,1.7). The resulting Absolute SkyRank calculated from the entire code of represented formulas, which includes a straight average of all calculated output components v, a, l, t, s is 1.0329. Absolute SkyRank ranges between 0 and 5, 0 as the most attractive rating and 5 as the least attractive. Lettered SkyRank translates the Absolute SkyRank to a letter. 1.0329 translates to B. Lettered SkyRank breaks down as follows:

A:0-1, B:>1-2, C:>2-3, D:>3-4, E:>4-5. Relative SkyRank compares 1.0329 to all other hedge fund Absolute SkyRanks in a database or against a peer group. 21.84% states that there are 21.84% of funds that have higher Absolute SkyRanks than this example hedge fund that was just rated.

An important aspect of SkyRank is that the rating will never lie outside of a specified range, in this case 0-5, A-E, and 0%-100%, Absolute SkyRank, Lettered SkyRank, and Relative SkyRank, respectively. A final part of the code accomplishes this, in addition to pieces of code relating directly to the hedge fund characteristics, assets, time and Sharpe Ratio, in this example. The code states that if the final averaged rating, of v,a,l,t,s is under 0, the Absolute SkyRank will equal 0; and if the averaged rating of v,a,l,t,s is above 5, Absolute SkyRank will equal 5.

Further explaining the operation from start to finish in this example: v(4) lies on 23 of formula y=0.2x, so, y(v)=0.8. a(200) lies on 28 and 29, so y=−1/50x+5, y(a)=1. 1(4) lies on 35 of formula 4=2/9x+5/9, y(1)=1.444. t(3) lies on both line segments 39 and 40, so y=−4/3x+5, y(t)=1. s(1.7) lies on 46, so y=−2/5x+8/5, y(s)=0.92. So the average(0.8, 1, 1.444, 1, 0.92)=1.0329. Of course, different weightings can occur also, based upon user preference.

CONCLUSION, RAMIFICATIONS, AND SCOPE

Accordingly, the reader will see that the invention described herein is a systematic methodology that is capable of analyzing multiple hedge fund characteristics defined by a user. The system derives formulas based upon a user's preference as to which hedge fund characteristics are important, and at user-defined preference levels. The system uses the user's defined importance levels and characteristics to derive formulas. After the formulas are derived, multiple hedge funds can be analyzed with one function that encompasses the formulas. The system limits the output of the rating to a defined range which is valuable to compare hedge funds ongoing. Unlike traditional sorting techniques, or other rating methodologies on the market, multiple hedge fund characteristics are analyzed simultaneously, with no qualitative judgment involved. Furthermore, the hedge fund rating system described has the additional advantages:

- it limits the Absolute SkyRank numerical rating to a number ranging between 0 and 5, the numerical rating going out 16 decimal places, providing a detail and consistency for the user to track relative performance of multiple hedge funds ongoing; and
- it provides three different ratings for the user: Absolute SkyRank (number), Lettered SkyRank (letter), and Relative SkyRank (percentage); and
- it enables a user to rely on an entirely systematic quantitative methodology, not subject to a panel of judges or analysts or other subjective measures; and
- it has no limit in the number of funds that it can analyze, assessing the various hedge fund characteristics simultaneously; and
- it provides for a rating to be revealed to the investor in absolute and relative form.

Although the description above contains many specificities, these should not be construed as limiting the scope of the invention but as merely providing illustrations of a preferred embodiment. There are many additional applications of the system. For example, in the above embodiment, five hedge fund characteristics are detailed, volatility, assets, leverage, time and Sharpe Ratio. There are additional hedge fund characteristics that are deemed important by hedge fund investors, such as Sortino Ratio, Value At Risk, liquidity and others. Some investors may prefer to reward funds that are less experienced, as measured by a lower threshold of time managing money. In this instance, the formulas would be derived in an opposite fashion than detailed herein, rewarding those funds with less tenure managing money. The value of the SkyRank System is that it can accept any user's preference and derive the formulas accordingly.

An additional application of the system is applying it to a portfolio of hedge funds to improve the performance of the portfolio. This application has been extensively tested. When capital is applied to the top SkyRanked hedge funds in typical portfolio of hedge funds, like a fund of hedge funds or an index of hedge funds, the result is a portfolio with lower volatility and higher returns over most time frames studied.

Thus the scope of the invention should be determined by the appended claims and their legal equivalents, rather than by the examples given.

The Visual Basic for Applications code, stored within Microsoft Excel, using a Pentium Processor, to calculate Absolute SkyRank based upon the above hedge fund characteristics of Volatility, Assets, Leverage, Time and Sharpe Ratio is defined as:

```
Option Explicit
Public Function vol1(v As Double) As Double
    vol1=0.2*v
End Function Public Function vol2(v As Double) As Double
    vol2=4/15*v−1/3
End Function Public Function volvol(v As Double) As Double
Dim vol1 As Double
Dim vol2 As Double
vol1=0.2*v
vol2=4/15*v−1/3
If v>5 Then
    volvol=vol2
Else
    volvol=vol1
End If
End Function Public Function asset1(a As Double) As Double
    asset1=(−1/50)*(a)+5
End Function Public Function asset2(a As Double) As Double
    asset2=(−1/800)*a+5/4
End Function Public Function asset3(a As Double) As Double
    asset3=0*a
End Function Public Function assetasset(a As Double) As Double
Dim asset1 As Double
Dim asset2 As Double
Dim asset3 As Double
asset1=(−1/50)*(a)+5
asset2=(−1/800)*a+5/4
asset3=0*a
```

```
If a>1000 Then
   assetasset=asset3
   Else
   If a>200 Then
   assetasset=asset2
   Else
   assetasset=asset1
   End If
   End If
End Function
Public Function leverage 1(1 As Double) As Double
   leverage1=1-1
End Function
Public Function leverage2(1 As Double) As Double
   leverage2=2/9*1+5/9
   End Function
Public Function leverageleverage(1 As Double) As Double
Dim leverage 1 As Double
Dim leverage2 As Double
leverage 1=1-1
leverage2=2/9*1+5/9
   If 1>2 Then
   leverageleverage=leverage2
   Else
   leverageleverage=leverage 1
   End If
End Function
   Public Function time1(t As Double) As Double
   time1=(-4/3)*t+5
End Function
Public Function time2(t As Double) As Double
   time2=(-1/2)*t+5/2
End Function
Public Function time3(t As Double) As Double
   time3=0*t
End Function
Public Function timetime(t As Double) As Double
Dim time1 As Double
Dim time2 As Double
Dim time3 As Double
time1=(-4/3)*t+5
time2=(-1/2)*t+5/2
time3=0*t
If t>5 Then
   timetime=time3
   Else
   If t>3 Then
   timetime=time2
   Else
   timetime=time1
   End If
End If End Function
Public Function sharpe1(s As Double) As Double
   sharpe1=(-8/3)*s+5
End Function
Public Function sharpe2(s As Double) As Double
   sharpe2=(-2/5)*s+8/5
   End Function
Public Function sharpe3(s As Double) As Double
sharpe3=0*s
End Function
Public Function sharpesharpe(s As Double) As Double
Dim sharpe1 As Double
Dim sharpe2 As Double
Dim sharpe3 As Double
sharpe1=(-8/3)*s+5
sharpe2=(-2/5)*s+8/5
sharpe3=0*s
If s>4 Then
   sharpesharpe=sharpe3
Else
   If s>1.5 Then
   sharpesharpe=sharpe2
   Else
   sharpesharpe=sharpe1
   End If
   End If
End Function
Public Function sky(v As Double, a As Double, 1 As Double, t As Double, s As Double)
As Double
Dim vol1 As Double
Dim vol2 As Double
Dim asset1 As Double
Dim asset2 As Double
Dim asset3 As Double
Dim leverage1 As Double
Dim leverage2 As Double
Dim time1 As Double
Dim time2 As Double
Dim time3 As Double
Dim sharpe1 As Double
Dim sharpe2 As Double
Dim sharpe3 As Double
Dim volvol As Double
Dim assetasset As Double
Dim leverageleverage As Double
Dim timetime As Double
Dim sharpesharpe As Double
```

```
vol1=0.2*v
vol2=4/15*v−1/3
asset1=(−1/50)*(a)+5
asset2=(−1/800)*a+5/4
asset3=0*a
leverage1=1−1
leverage2=2/9*1+5/9
time1=(−4/3)*t+5
time2=(−1/2)*t+5/2
time3=0*t
sharpe1=(−8/3)*s+5
sharpe2=(−2/5)*s+8/5
sharpe3=0*s
If v>5 Then
    volvol=vol2
    Else
    volvol=vol1
End If
If a>1000 Then
    assetasset=asset3
    Else If a>200 Then
    assetasset=asset2
    Else
    assetasset=asset1
    End If
End If
If 1>2 Then
    leverageleverage=leverage2
    Else
    leverageleverage=leverage1
End If
If t>5 Then
    timetime=time3
    Else
If t>3 Then
    timetime=time2
    Else
    timetime=time 1
    End If
End If
If s>4 Then
    sharpesharpe=sharpe3
    Else
If s>1.5 Then
    sharpesharpe=sharpe2
    Else
    sharpesharpe=sharpe1
End If
End If
sky=(volvol+assetasset+leverageleverage+timetime+sharpesharpe)/5
If sky>5 Then
    sky=5
    Else
If sky<0 Then
    sky=0
    Else
    sky=(volvol+assetasset+leverageleverage+timetime+sharpesharpe)/5
End If
End If
End Function
```

What is claimed is:

1. A system for providing a rating of a hedge fund comprising
    a computer,
    a database accessible by said computer,
    said database having stored data on one or more hedge funds, and
    a processor configured to
    identify at least three data points, each pertinent to a first numerical investment characteristic;
    interpolate, based on the at least three data points, a formula describing a desirability of a fund based on the first numerical investment characteristic;
    identify a candidate fund from the database;
    identify numerical information from the database describing the first investment characteristic corresponding to the candidate fund;
    evaluate the formula based on the identified numerical information, thereby producing numerical rating output; and
    display the rating output.

2. The data processing system of claim 1 wherein said data processing system is entirely systematic and rating output is based directly upon data processing system.

3. The data processing system of claim 1 wherein the first numerical investment characteristic includes volatility of returns.

4. The data processing system of claim 1 wherein the first numerical investment characteristic includes assets under management.

5. The data processing system of claim 1 wherein the first numerical investment characteristic includes leverage.

6. The data processing system of claim 1 wherein the first numerical investment characteristic includes time managing the hedge fund.

7. The data processing system of claim 1 wherein the first numerical investment characteristic includes Sharpe Ratio.

8. The data processing system of claim 1 wherein the first numerical investment characteristic includes Sortino Ratio.

9. The data processing system of claim 1 wherein the first numerical investment characteristic includes liquidity of underlying hedge fund.

10. The data processing system of claim 1 wherein the first numerical investment characteristic includes gamma risk.

11. The data processing system of claim 1 wherein the first numerical investment characteristic includes delta risk.

12. The data processing system of claim 1 wherein the first numerical investment characteristic includes vega risk.

13. The data processing system of claim 1 wherein the first numerical investment characteristic includes rho risk.

14. The data processing system of claim 1 wherein the first numerical investment characteristic includes alpha generation.

15. The data processing system of claim 1 wherein the shorter-term risk-adjusted returns and ratings will be weighted higher than the longer-term risk-adjusted returns and ratings.

16. The data processing system of claim 1, wherein the processor is further configured to identify at least three data points, each data point pertinent to a second numerical investment characteristic; interpolate, based on the at least three data points, a second formula describing a desirability of a fund based on the second numerical investment characteristic; identify second numerical information from the database describing the second investment characteristic corresponding to the candidate fund; evaluate the second formula based on the identified second numerical information, thereby producing numerical rating output that is a linear combination of at least the first and second formulas.

17. The data processing system of claim 1, in which the processor is configured to interpolate piecewise-linearly.

18. The data processing system of claim 1, in which the processor is configured to interpolate using quadratic formulas.

* * * * *